(12) United States Patent
Meesala et al.

(10) Patent No.: US 11,767,821 B2
(45) Date of Patent: Sep. 26, 2023

(54) SYSTEM AND METHOD FOR RESPONDING TO A FRICTION COEFFICIENT SIGNAL OF A WIND TURBINE

(71) Applicant: General Electric Renovables Espana, S.L., Barcelona (ES)

(72) Inventors: Vidya Sagar Meesala, Hamburg (DE); Misha Gupta, Bangalore (IN); Pranav Agarwal, Fremont, CA (US); Manthram Sivasubramaniam, Bangalore (IN); Justin Edwin Barton, Glenville, NY (US); Frederick Wilson Wheeler, Niskayuna, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/536,194

(22) Filed: Nov. 29, 2021

(65) Prior Publication Data
US 2023/0167803 A1 Jun. 1, 2023

(51) Int. Cl.
*F03D 7/04* (2006.01)
*F03D 7/02* (2006.01)
*F03D 80/70* (2016.01)

(52) U.S. Cl.
CPC .......... *F03D 7/045* (2013.01); *F03D 7/0224* (2013.01); *F03D 80/70* (2016.05);
(Continued)

(58) Field of Classification Search
CPC ........ F03D 7/0224; F03D 7/045; F03D 80/70; F05B 2260/84; F05B 2270/327;
(Continued)

(56) References Cited

U.S. PATENT DOCUMENTS 5,907,192 A    5/1999   Lyons et al.
6,819,086 B2   11/2004  Wobben
(Continued)

FOREIGN PATENT DOCUMENTS

CN    207485607 U    6/2018
EP      2589800 A1   5/2013
(Continued)

OTHER PUBLICATIONS

EP Search Report for EP application No. 22205844.8, dated Mar. 30, 2023, 7 pages.

*Primary Examiner* — Tulsidas C Patel
*Assistant Examiner* — Thomas K Quigley
(74) *Attorney, Agent, or Firm* — Dority & Manning, P.A.

(57) ABSTRACT

The present disclosure is directed to a method for responding to a friction coefficient signal of a pitch bearing of a pitch drive mechanism of a wind turbine and/or for controlling the pitch drive mechanism(s) and/or a bank of ultracapacitors. The method and system include: accessing high-frequency measurement data of the at least one pitch bearing; estimating, via a torque balance model implemented by a controller, a frictional torque of the at least one pitch bearing based, at least in part, on the high-frequency measurement data; estimating, via the controller, a friction coefficient signal of the at least one pitch bearing based, at least in part, on the frictional torque; comparing the friction coefficient signal with a friction threshold; determining whether the friction coefficient signal deviates from the friction threshold based, at least in part, on the comparison; and, if so, acting.

20 Claims, 8 Drawing Sheets

(52) U.S. Cl.
CPC ..... *F05B 2260/84* (2013.01); *F05B 2270/327* (2013.01); *F05B 2270/328* (2013.01); *F05B 2270/331* (2013.01); *F05B 2270/342* (2020.08)

(58) Field of Classification Search
CPC .......... F05B 2270/328; F05B 2270/331; F05B 2270/342
See application file for complete search history.

(56) References Cited

U.S. PATENT DOCUMENTS

| | | | |
|---|---|---|---|
| 7,235,996 | B2 | 6/2007 | Middendorf et al. |
| 7,355,294 | B2 | 4/2008 | Teichmann |
| 7,745,948 | B2 | 6/2010 | Kerber |
| 7,956,482 | B2 | 6/2011 | Nies et al. |
| 8,070,439 | B2 | 12/2011 | Melius |
| 8,096,762 | B2 | 1/2012 | Risager et al. |
| 8,517,671 | B2 * | 8/2013 | Noda ................... F03D 7/0224 415/123 |
| 8,534,128 | B2 | 9/2013 | Murayama |
| 8,740,543 | B2 * | 6/2014 | Weaver ................ F03D 7/0224 415/908 |
| 8,933,577 | B2 | 1/2015 | Ahnert et al. |
| 8,941,351 | B2 | 1/2015 | Becker et al. |
| 9,086,048 | B2 | 7/2015 | Roesmann et al. |
| 9,200,979 | B2 | 12/2015 | Goodman et al. |
| 9,297,360 | B2 | 3/2016 | Bertolotti et al. |
| 9,417,156 | B2 | 8/2016 | Gattermann et al. |
| 9,422,919 | B2 | 8/2016 | Bertolotti et al. |
| 9,425,716 | B2 | 8/2016 | Kestermann |
| 9,784,241 | B2 | 10/2017 | Blom et al. |
| 9,793,756 | B2 | 10/2017 | Palomares Rentero et al. |
| 10,012,212 | B2 * | 7/2018 | Kacmarcik ........... F16C 19/184 |
| 10,273,940 | B2 | 4/2019 | Pan et al. |
| 10,309,371 | B2 * | 6/2019 | Hinks ..................... B64C 11/06 |
| 10,655,607 | B2 | 5/2020 | Potter et al. |
| 10,781,797 | B2 * | 9/2020 | Sørensen ................ F16C 25/04 |
| 10,914,290 | B2 | 2/2021 | Hoffmann et al. |
| 10,927,819 | B2 | 2/2021 | Elmose et al. |
| 11,002,250 | B2 | 5/2021 | Grunner et al. |
| 2011/0142634 | A1 | 6/2011 | Menke et al. |
| 2011/0200425 | A1 * | 8/2011 | Weaver ................. B66C 23/207 29/469 |
| 2012/0009063 | A1 * | 1/2012 | Noda .................... F03D 7/0224 416/9 |
| 2012/0087792 | A1 | 4/2012 | Cousineau et al. |
| 2013/0323055 | A1 | 12/2013 | Eden |
| 2013/0334818 | A1 | 12/2013 | Mashal et al. |
| 2015/0152843 | A1 | 6/2015 | Vetter et al. |
| 2015/0184634 | A1 | 7/2015 | Shen et al. |
| 2015/0316033 | A1 | 11/2015 | Rosmann et al. |
| 2016/0298603 | A1 * | 10/2016 | Guern ..................... F16D 3/60 |
| 2016/0298604 | A1 * | 10/2016 | Guern ..................... F03D 9/25 |
| 2017/0096984 | A1 * | 4/2017 | Kacmarcik .......... F16C 19/522 |
| 2017/0334549 | A1 * | 11/2017 | Hinks .................. F03D 7/0224 |
| 2018/0291870 | A1 | 10/2018 | Theopold et al. |
| 2019/0113026 | A1 * | 4/2019 | Sørensen ................ F16C 33/26 |
| 2019/0219032 | A1 | 7/2019 | He et al. |
| 2020/0096418 | A1 | 3/2020 | Nowoisky et al. |

FOREIGN PATENT DOCUMENTS

| | | |
|---|---|---|
| EP | 2317129 B1 | 6/2013 |
| EP | 2667020 A1 | 11/2013 |
| WO | WO2007/132303 A1 | 11/2007 |
| WO | WO2010/109262 A2 | 9/2010 |
| WO | WO 2021/086338 A1 | 5/2021 |

* cited by examiner

SYSTEM AND METHOD FOR RESPONDING TO A FRICTION COEFFICIENT SIGNAL OF A WIND TURBINE

FIELD

The present disclosure relates generally to wind turbines, and more particularly, to a system and method for responding to a friction coefficient signal of a wind turbine based on high-frequency measurement data.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Each of the rotor blades generally includes a pitch drive mechanism located in the hub of the wind turbine that is used to safely operate the wind turbine and to extract the maximum amount of power under given wind conditions, i.e., by changing the angle of the rotor blades relative to the wind. Such pitch drive mechanisms typically include a pitch motor, a pitch gearbox, and a pitch pinion that engages a pitch bearing. Further, the pitch motor is typically coupled to the pitch gearbox such that the pitch motor imparts mechanical force to the pitch gearbox. Similarly, the pitch gearbox may be coupled to the pitch pinion for rotation therewith. The pitch pinion may, in turn, be in rotational engagement with the pitch bearing coupled between the hub and one of the rotor blades such that rotation of the pitch pinion causes rotation of the pitch bearing. Thus, rotation of the pitch motor drives the pitch gearbox and the pitch pinion, thereby rotating the pitch bearing and the corresponding rotor blade about a pitch axis.

Therefore, the pitch drive mechanism is configured to translate the mechanical force from the pitch motor to the rotor blade. Unfortunately, other forces acting on the rotor blade, or on/from other components of the pitch drive mechanism, may also translate through the pitch drive mechanism. For example, during operation of the pitch drive mechanism, other components of the pitch drive mechanism such as the pitch pinion may create or experience forces or moments that are translated, at least in part, through the pitch drive mechanism. Further, a friction moment between any two components of the pitch drive mechanism, and/or a frictional torque between any two dynamic components of the pitch drive mechanism, may be translated, at least in part, through the pitch drive mechanism. Some of these may be translated, at least in part, through the pitch drive mechanism to the pitch motor.

Due to the above, the rotor blade and the pitch drive mechanism may be forced to operate under high force or moment conditions and can fail prematurely over the lifetime of the wind turbine. For example, a failure of the pitch bearing can force the wind turbine to be shutdown and repaired. The repair process for pitch bearings is very complex and can take an extended amount of time to be complete. Therefore, wind turbine operators can incur substantial losses due to the downtime of a wind turbine caused by a pitch bearing failure.

Conventional pitch control diagnostic systems available in the field utilize continuous 10-minute supervisory control and data acquisition (SCADA) data, and primarily rely on pitch motor current—a proxy for the overall torque experienced by the wind turbine and translated to the pitch motor—as an indicator for pitch bearing, race, or cage damage. These systems, however, ignore the confounding effects of aerodynamic torque, for example. Moreover, at the standard 10-minute data sample rate, there is a significant reduction in the predictive precision of these systems. Furthermore, conventional pitch control diagnostic systems are not normalized with respect to exogenous factors such as pitch activity, thrust level, load, D/Q moments, mean current, pitch angle, etc. Convention pitch control diagnostic systems are not good indicators of low damage levels in the pitch bearings and usually require a 30-day accumulation of data for averaging purposes.

In addition, wind turbine operation and control systems also are often inadequately prepared to deal with and workaround the possibility of a broken or damaged pitch gearbox, a spalled pitch bearing, or a total pitch drive mechanism failure. For example, ultracapacitors are commonly used to safely shutdown a wind turbine in case of grid loss conditions. Therefore, operation and control systems must be capable of handling both expected shutdown conditions and extreme shutdown conditions alike, even if the extreme shutdown conditions demand—due to unexpected and prolonged elevations in pitch bearing friction, for example—more energy than is expected or desired. Unfortunately, for conventional shutdown systems, as more capacitors or batteries are incorporated into a system, the system only becomes more expensive to implement and run, and less reliable and safe to operate. Ultracapacitors can be used and relied upon to provide power in these extreme conditions; however, ultracapacitors can lose the ability to provide sufficient voltage to power a load as the ultracapacitors age.

For instance, as an ultracapacitor approaches end of life, an output voltage that the ultracapacitor provides to a load can drop quickly. The inability of the ultracapacitor to provide a required output voltage to power a load in certain conditions can pose many challenges. For instance, the inability of an ultracapacitor to power a load acting on the pitch drive mechanism can result in an inability to pitch a wind turbine blade during extreme conditions, potentially leading to catastrophic damage to the wind turbine.

In view of the aforementioned, there is a need for a pitch bearing monitoring system that can give an early warning signal regarding various pitch bearing conditions such that shutdown, repair, and/or maintenance processes can be improved, and downtime and related losses can be minimized. Thus, the present disclosure is directed to a system and method for monitoring and responding to a friction coefficient signal of pitch bearing using high-frequency measurement data that addresses the aforementioned issues.

BRIEF DESCRIPTION

Aspects and advantages of the disclosure will be set forth in part in the following description, or may be obvious from the description, or may be learned through practice of the disclosure.

In an aspect, the present disclosure is directed to a method for responding to a friction coefficient signal of at least one pitch bearing of a wind turbine. The method includes accessing, via a controller, high-frequency measurement data from the pitch drive mechanism of the at least one pitch bearing, which may be about 40 hertz (Hz) measurement data, for example, between about 10 millisecond (ms) to about 40 ms sample rate for the measurement data, for example, or between about 1 ms to about 400 ms sample rate for the measurement data, for example. The method also includes estimating, via a computer-implemented model implemented by the controller, a frictional torque of the at least one pitch bearing based, at least in part, on the high-frequency measurement data, wherein the computer-implemented model implemented by the controller may be, for example, a torque balance model. The method also includes estimating, via the controller, a friction coefficient signal of the at least one pitch bearing based, at least in part, on the frictional torque. The method also includes comparing the friction coefficient signal with a friction threshold, wherein the friction coefficient signal of the at least one pitch bearing varying or deviating from the friction threshold by a certain amount may be indicative of an actionable event or circumstance related to the at least one pitch bearing. In certain embodiments, the method includes determining whether the friction coefficient signal deviates from the friction threshold based, at least in part, on the comparison, wherein if the friction coefficient signal deviates from the friction threshold, then the deviation is indicative of damage present in the at least one pitch bearing. The method may also include implementing a control action in response to a determination that the friction coefficient signal deviates from the friction threshold.

In yet another aspect, the present disclosure is directed to a system for mitigating damage of at least one pitch bearing of a wind turbine and for controlling the wind turbine in response to the damage. The system includes a pitch control system having a controller and pitch drive mechanisms each having pitch motor(s) each with a pitch bearing. The controller includes a high-frequency measurement data interface configured to receive high-frequency measurement data from the pitch drive mechanism and a processor. The processor is configured to receive high-frequency measurement data from the pitch drive mechanism of the at least one pitch bearing in short time intervals, which may be, for example, between about 3 minute (min) to about 4 min or between about 1 min to about 10 min, or continuously. The processor also is configured to estimate an aerodynamic torque using the high-frequency measurement data. The processor also is configured to estimate, via a computer-implemented model, a frictional torque of the at least one pitch bearing based, at least in part, on the high-frequency measurement data and the aerodynamic torque. The processor also is configured to estimate a friction coefficient signal of the pitch bearing based, at least in part, on the frictional torque. The processor also is configured to compare the friction coefficient signal with a friction threshold and determine whether damage is present in the pitch bearing based, at least in part, on the comparison. The processor also is configured to implement a control action in response to a determination that damage is present in the at least one pitch bearing, for example, sending a command to at least one pitch drive mechanism or the components thereof, shutting down the wind turbine, derating the wind turbine, uprating the wind turbine, etc.

In yet another aspect, the present disclosure also is directed to a system for determining if the friction coefficient signal deviates from the friction threshold for at least one pitch bearing of a wind turbine and for controlling the wind turbine in response to that determination. The system includes a pitch control system having a controller and pitch drive mechanisms each having pitch motor(s) each with a pitch bearing, and a bank of ultracapacitors in electrical communication at least with the pitch drive mechanism. The bank of ultracapacitors are configured to power, at least in part, the pitch drive mechanism. The controller includes a high-frequency measurement data interface configured to receive high-frequency measurement data from the pitch drive mechanism and a processor. The controller also includes an ultracapacitor interface configured to communicate with the bank of ultracapacitors. The processor is configured to receive high-frequency measurement data from the pitch drive mechanism of the at least one pitch bearing. The processor also is configured to estimate an aerodynamic torque using the high-frequency measurement data. The processor also is configured to estimate, via a computer-implemented model, a frictional torque of the at least one pitch bearing based, at least in part, on the high-frequency measurement data and the aerodynamic torque. The processor also is configured to estimate a friction coefficient signal of the pitch bearing based, at least in part, on the frictional torque. The processor also is configured to compare the friction coefficient signal with a friction threshold and determine whether the friction coefficient signal deviates from the friction threshold based, at least in part, on the comparison. The processor also is configured to implement a control action in response to a determination that the friction coefficient signal deviates from the friction threshold, for example, controlling the bank of ultracapacitors in response to the determination that the friction signal deviates from the friction threshold and operating to facilitate shutting down the wind turbine, adjusting the charge of the bank of ultracapacitors, derating the wind turbine, scheduling maintenance or repair, planning for future events or expectations, etc, or simply to determine if the bank of ultracapacitors at any one moment in time have enough energy to physically move the wind turbine blades via the pitch drive mechanisms, for example.

These and other features, aspects, and advantages of the present disclosure will become better understood with reference to the following description and appended claims. The accompanying drawings, which are incorporated in and constitute a part of this specification, illustrate embodiments of the disclosure and, together with the description, explain the principles of the disclosure.

BRIEF DESCRIPTION OF THE DRAWINGS

A full and enabling disclosure of the present inventive concepts, including the best mode thereof, directed to one of ordinary skill in the art, is set forth in the specification, which makes reference to the appended figures, in which.

DETAILED DESCRIPTION

Figure 1:
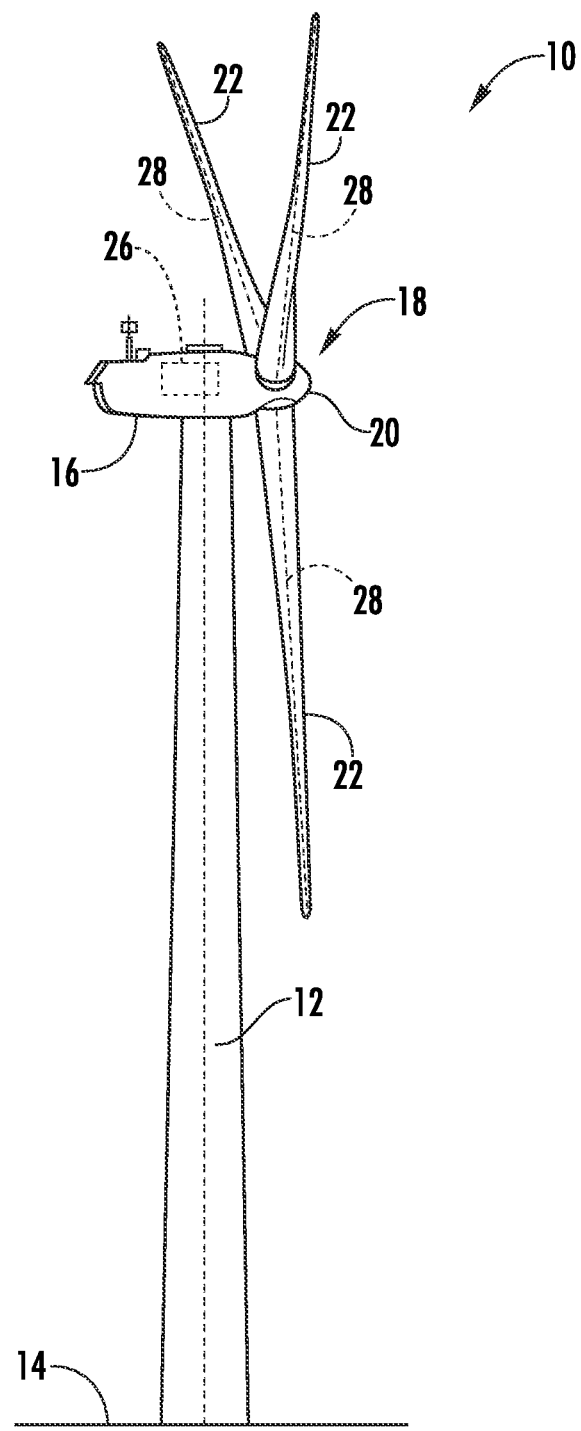
FIG. 1 illustrates a perspective view of an embodiment of a wind turbine according to the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

A pitch drive mechanism is configured to translate the mechanical force from a pitch motor to a rotor blade. Other forces acting on the rotor blade, or on/from the other components of the mechanism, also translate, at least in part, through the pitch drive mechanism. For example, an aerodynamic load on the rotor blade may produce a torque on the rotor blade (i.e., produce a moment on the rotor blade that yields a change in angular momentum of the rotor blade about a pitch axis) that rotates the pitch bearing and drives a pitch pinion and a pitch gearbox, thereby imparting mechanical force to the pitch motor (which is described herein as the "aerodynamic torque"). In this way, the aerodynamic load is translated, at least in part, through the pitch drive mechanism to the pitch motor.

Even when the pitch drive mechanism(s) and the rotor blade(s) are idle—or during operation of one, the other, or both—the rotor blade and the components of the pitch drive mechanism may create or experience forces or moments that are translated, at least in part, through the pitch drive mechanism. A friction moment between any two components of the pitch drive mechanism, and/or a frictional torque between any two components of the pitch drive mechanism and/or the pitch bearing itself (which is referred to herein as the "frictional torque of the pitch bearing") may be translated, at least in part, through the pitch drive mechanism to the pitch motor. Moreover, an overall torque experienced by the rotor blade and pitch drive mechanism, and translated to the pitch motor, can be characterized as the sum of (1) the aerodynamic torque; (2) the frictional torque of the pitch bearing; and (3) a torque resulting from a pitch acceleration or deceleration of the rotor blade.

With the above context in mind, the present disclosure is directed to a system and method for responding to a friction coefficient signal of a wind turbine, or more particularly for responding to a friction coefficient signal of a slewing ring bearing (such as a pitch bearing or a yaw bearing, for example) based on high-frequency measurement data. As used herein, a slewing ring bearing generally refers to a rotational rolling-element bearing that generally supports a heavy but slow-turning load. For example, slewing ring bearings generally include an inner race and an outer race rotatable with respect the inner race via one or more rolling elements.

In an embodiment, the pitch bearing is controlled by a pitch drive mechanism that, along with a controller, is part of a broader pitch control system. Thus, the pitch control system may have multiple pitch drive mechanisms each having a pitch motor(s) each having a corresponding pitch bearing(s). Accordingly, in such embodiments, the method includes receiving high-frequency operational measurement data of pitch bearing(s) in short time intervals or continuously. Further, an embodiment of the method includes estimating an aerodynamic torque using the high-frequency measurement data and estimating a frictional torque of the pitch bearing(s) based, at least in part, on the high-frequency measurement data and the estimated aerodynamic torque. Further, the method includes estimating a friction coefficient signal of the pitch bearing(s) based, at least in part, on the frictional torque of the pitch bearing(s). Thus, the method includes comparing the friction coefficient signal with a friction threshold and determining, for example, whether damage is present in the pitch bearing(s) based, at least in part, on the comparison.

Measurement data is an important input useful for estimating the current damage level and the remaining useful life of certain mechanical components of a wind turbine, for example. The overall useful life of these mechanical components depends on the cumulative wear associated with individual mechanisms of the wind turbine and/or the cumulative wear associated with the components of the individual mechanisms of the wind turbine. This is true for the pitch bearing in general, and for the inner race, the outer race, and the one or more rolling elements, for example.

Most industrial sensors capture data at low frequencies, for example, sample rates of about 10 mins. However, in order to use model-based estimation techniques, sensor data must be sampled fast enough to capture the physical dynamics of the system. Hence, it is important to sample measurement data signals at high frequency. Time series data analysis traditionally can rely on the available time series sampling frequency. Events occurring at frequencies higher than half of the sampling frequency run a risk of being misrepresented by the sampled signal. In some instances, higher than normal sampling frequency data is available in order to record anomalies or specific stages of operation.

Accordingly, the present disclosure provides many advantages not present in the prior art. For example, pitch bearing friction is influenced by several factors, e.g., cage design, seal design and/or type, bearing geometry, and/or load, and typically is challenging to ascertain or estimate. This challenge is magnified when the task is to understand the pitch bearing friction as a function of time. Thus, the system and method of the present disclosure enables, in certain embodiments, continuous monitoring of the health condition of the pitch bearing(s) of a wind turbine. Thus, a benefit is that a wind turbine operator can schedule needed services in advance of pitch bearing damage or failure—to significantly reduce downtime of the wind turbine from intermediate blade-stuck cases resulting from high aerodynamic loads on the rotor blades, for example, or from the friction simply being too high to adequately and/or safely control pitch. In addition, the cost of operating and warrantying a wind turbine is reduced—due to better planning and resource allocation.

Furthermore, the system and method of the present disclosure provides a solution for controlling operation of a wind turbine including a bank of ultracapacitors within safety limits, regulatory limits, and/or within the optimal parameters for which the wind turbine, the rotor blade, and/or the pitch drive mechanism are designed. For example, some wind turbines may include a bank of ultracapacitors used to power the pitch drive mechanism(s) under certain circumstances. Due to the fact that as more ultracapacitors are incorporated into the bank of ultracapacitor, the bank of ultracapacitors only becomes more costly, less reliable, and riskier (in terms of discharge risk, for example), ultracapacitor-based systems may not include a sufficient number of ultracapacitors. Thus, the system and method of the present disclosure further provides a solution for controlling and maintaining operation of a wind turbine during conditions when the estimates of pitch bearing friction are within the design limits of the bank of ultracapacitors, for example.

The system and method of the present disclosure also provides a process for estimating the friction signal of the pitch bearing(s) such that the pitch drive mechanism(s) and the other related system(s)—like the bank of ultracapacitors—can be optimized, customized, and/or specialty tailored. Thus, the system and method of the present disclosure provides a process for estimating the pitch bearing friction over the expected useful life of a pitch bearing such that the bank of ultracapacitors can be specialty designed to have a desired total energy capacity, and sufficient energy capacity margin, to buffer against unexpected and prolonged elevations in aerodynamic loads and pitch bearing friction, for example, but without a max capacity that exceeds cost or safety limits.

Referring now the drawings, FIG. 1 illustrates a perspective view of an embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 also includes a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components, assess operation of the components, and/or implement a control or correction action. As such, the controller 26 may include a computer or other suitable processing unit. Thus, in several embodiments, the controller 26 may include suitable computer-readable instructions that when implemented configure the controller 26 to perform various different functions, such as receiving, transmitting and/or executing pitch control signals and/or ultracapacitor control signals. Accordingly, the controller 26 may generally be configured to control the various operating modes (e.g., a shutdown sequence) of the wind turbine 10.

Figure 2:
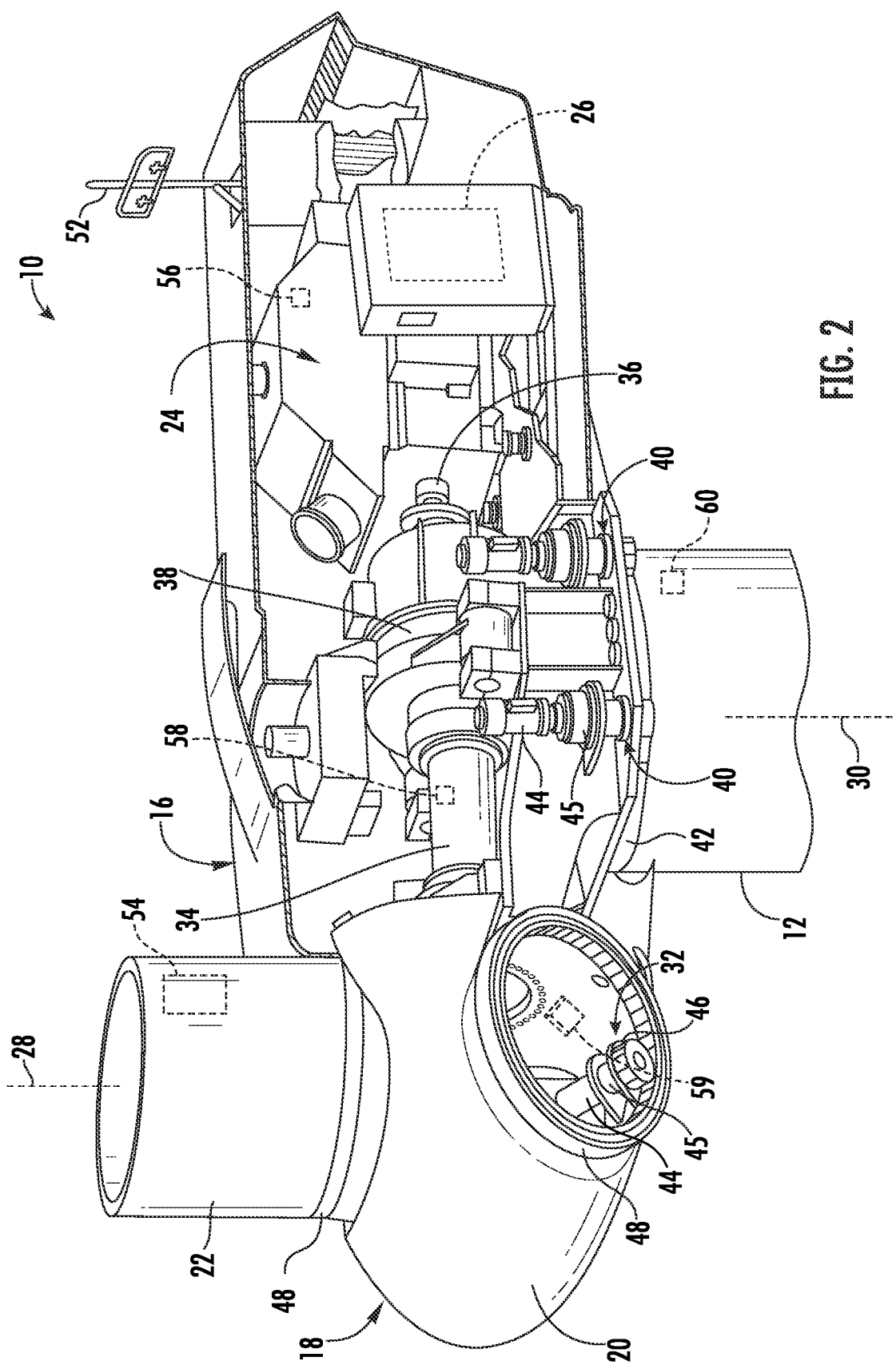
FIG. 2 illustrates a simplified, internal view of an embodiment of the nacelle of the wind turbine of FIG. 1.

Referring now to FIG. 2, a simplified, internal view of an embodiment of the nacelle 16 of the wind turbine 10 shown in FIG. 1 is illustrated. As shown, the generator 24 is be disposed within the nacelle 16. In general, the generator 24 may be coupled to the rotor 18 for producing electrical power from the rotational energy generated by the rotor 18. For example, as shown, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 includes pitch drive mechanism 32 configured to change the angle of the blades 22 relative to the wind (e.g., by engaging a pitch bearing 48). Further, each pitch drive mechanism 32 may include a pitch motor 44 (e.g., any suitable electric motor), a pitch gearbox 45, and a pitch pinion 46. In such embodiments, the pitch motor 44 may be coupled to the pitch gearbox 45 so that the pitch motor 44 imparts mechanical force to the pitch gearbox 45. Similarly, the pitch gearbox 45 may be coupled to the pitch pinion 46 for rotation therewith. The pitch pinion 46 may, in turn, be in rotational engagement with a pitch bearing 48 coupled between the hub 20 and one of the rotor blades 22 such that rotation of the pitch pinion 46 causes rotation of the pitch bearing 48. Thus, in such embodiments, rotation of the pitch motor 44 drives the pitch gearbox 45 and the pitch pinion 46, thereby rotating the pitch bearing 48 and the corresponding rotor blade 22 about the pitch axis 28.

Similarly, the wind turbine 10 also includes one or more yaw drive mechanism 40 communicatively coupled to the controller 26, with each yaw drive mechanism(s) 40 being configured to rotate the yaw bearing 42 and thus the nacelle 16 about the yaw axis 30.

In addition, the wind turbine 10 also includes sensors 52 for monitoring various environmental and external conditions as well as measurement data during operation of the wind turbine 10. For example, as shown in FIG. 2, the wind direction, wind speed, or any other suitable wind condition close to the wind turbine 10 may be measured, such as through use of a suitable weather sensor 52. Suitable weather sensors 52 include, for example, Light Detection and Ranging ("LIDAR") devices, Sonic Detection and Ranging ("SODAR") devices, anemometers, wind vanes, barometers, radar devices (such as Doppler radar devices, for example) or any other sensing device which can provide wind directional information.

The wind turbine 10 also includes additional sensors for monitoring various electrical, vibration, and operational signals of the turbine. Such sensors may include blade sensors 54 for monitoring the rotor blades 22; generator sensors 56 for monitoring the torque, the rotational speed, the acceleration and/or the power output of the generator 24; shaft sensors 58 for measuring and/or estimating the loads translated through the rotor shaft 34 and/or the rotational speed of the rotor shaft 34, and/or a pitch sensor 59 for monitoring each of the pitch drive mechanisms 32. Additionally, the wind turbine 10 may include one or more tower sensors 60 for measuring and/or estimating the loads translated through the tower 12 and/or the acceleration of the tower 12. Of course, the wind turbine 10 may further include various other suitable sensors for measuring and/or estimating any other suitable operating, control, and/or load condition of the wind turbine 10.

The sensors 52, 54, 56, 58, 59, 60 are in communication with the controller 26, and provide related information to the controller 26. Additional sensors (not illustrated) can include electrical, magnetic, vibration, thermal, optical, ultrasonic, and/or acoustics sensors used as part of a test system for conducting test operations of any part or component of the wind turbine 10, including a bank of ultracapacitors 160 (FIG. 8) to determine a capacitance of the bank of ultracapacitors 160, for example. However, it is important to note that the systems and methods of the present disclosure do not require the use of vibration, ultrasonic, or acoustic sensors.

Figure 3:
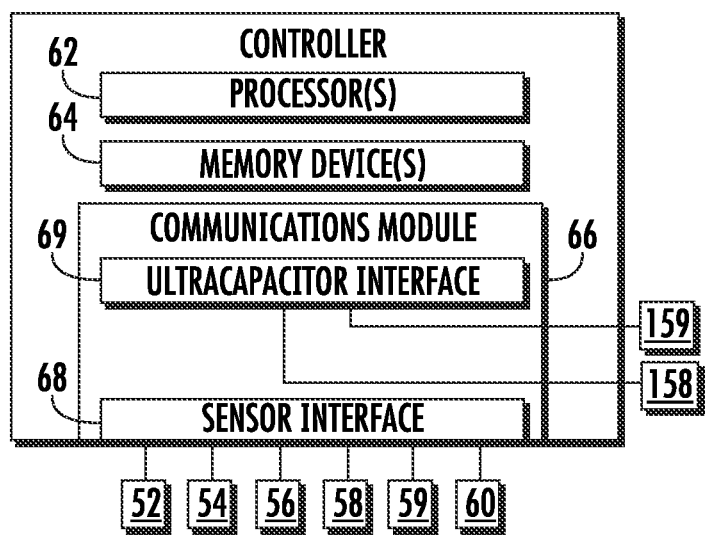
FIG. 3 illustrates a block diagram of an embodiment of suitable components that can be included within a controller of a system according to the present disclosure.

Referring particularly to FIG. 3, the controller 26 is configured to control any of the components of the wind turbine 10 and/or implement the method steps as described herein. Moreover, in certain embodiments, the controller 26 may be part of the wind turbine 10, such as within the nacelle 16 of the wind turbine 10 or in or around a base on the wind turbine 10 as well as in remote locations, distributed, and network-based or cloud-based. For example, as shown, the controller 26 may include one or more processor(s) 62 and associated memory device(s) 64 configured to perform a variety of computer-implemented functions (e.g., performing the methods, steps, calculations and the like and storing relevant data as disclosed herein). Additionally, the controller 26 may also include a communications module 66 to facilitate communications between the controller 26 and the various components of the wind turbine 10, e.g., any of the components of FIGS. 1 and 2. Further, the communications module 66 may include a sensor interface 68 (e.g., one or more analog-to-digital converters) to permit signals transmitted from one or more sensors to be converted into signals that can be understood and processed by the processor(s) 62 as well as an optional ultracapacitor interface 69, which is described below in more detail. It should be appreciated that the sensors (e.g., sensors 52, 54, 56, 58, 59, 60) may be communicatively coupled to the communications module 66 using any suitable means. For example, as shown in FIG. 3, the sensors 52, 54, 56, 58, 59, 60 may be coupled to the sensor interface 68 via a wired connection. However, in other embodiments, the sensors 52, 54, 56, 58, 59, 60 may be coupled to the sensor interface 68 via a wireless connection, such as by using any suitable wireless communications protocol known in the art. As such, the processor(s) 62 may be configured to receive one or more signals from the sensors.

Figure 7:
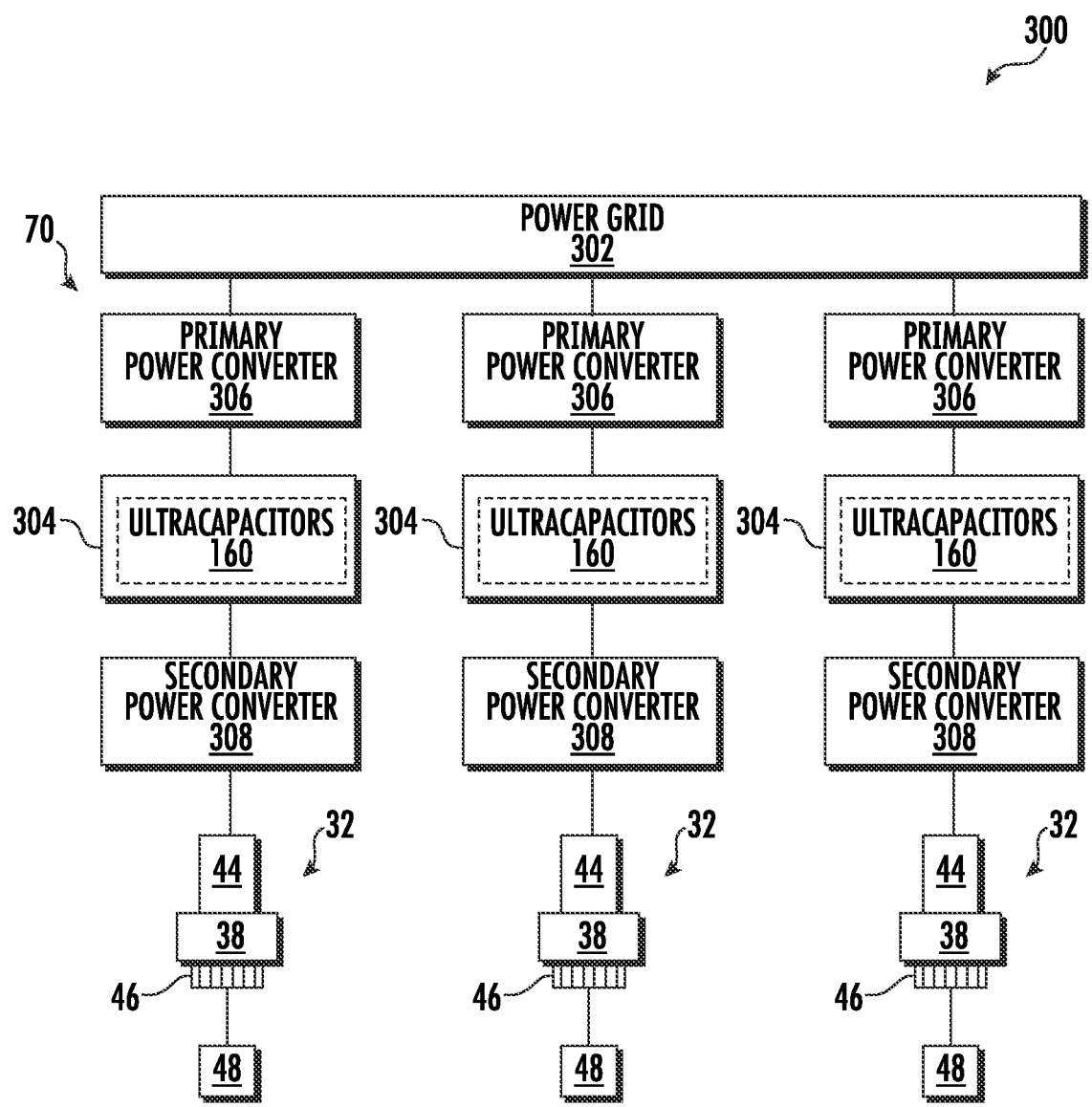
FIG. 7 illustrates a schematic diagram of an embodiment of a system for responding to a friction coefficient signal of pitch bearing(s) and controlling pitch drive mechanism(s) and the bank of ultracapacitors according to the present disclosure.
Figure 8:
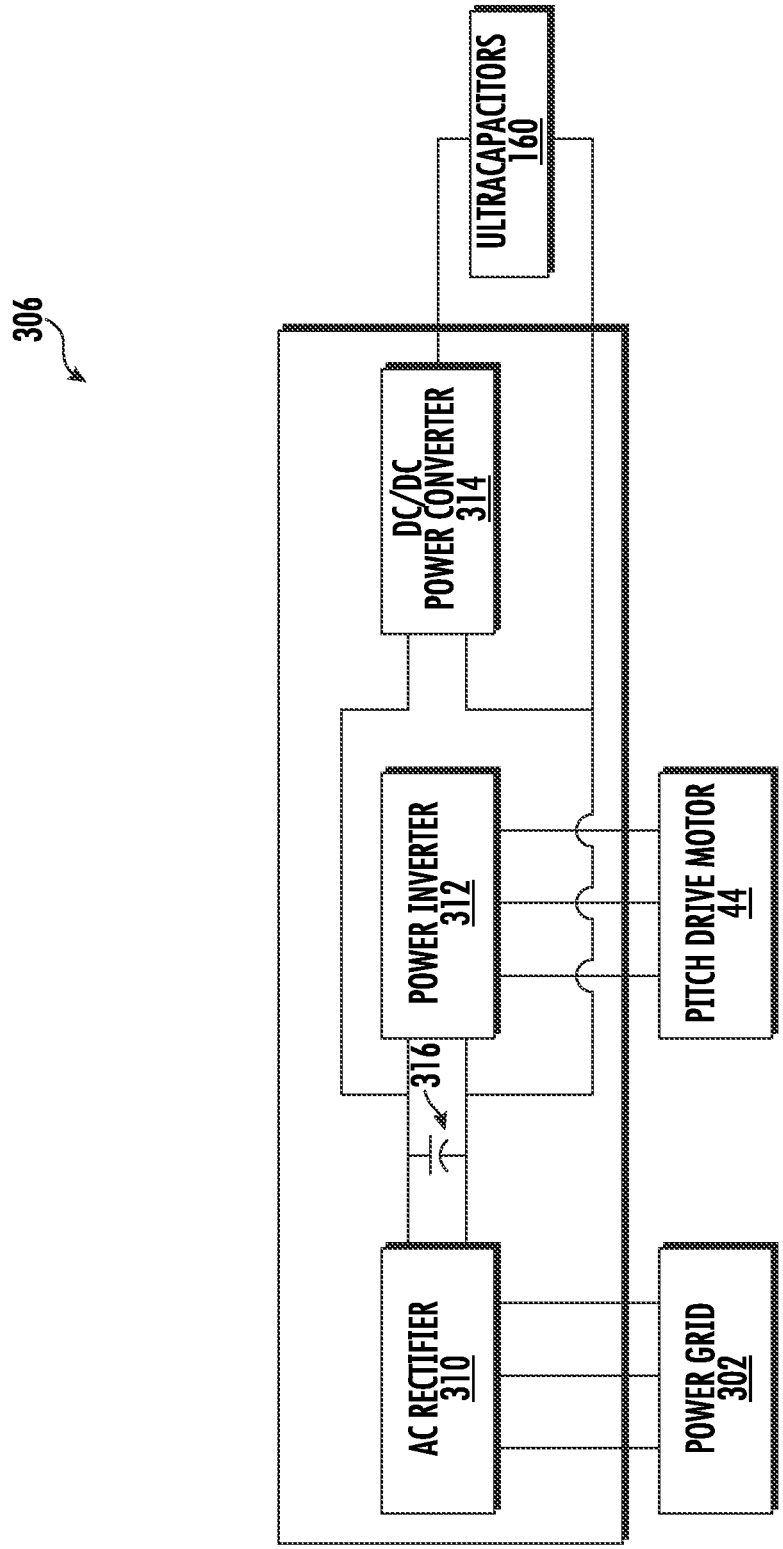
FIG. 8 illustrates a schematic diagram of an embodiment of a power converter system of a bank of ultracapacitors according to the present disclosure.

Further, as shown, the ultracapacitor interface 69 is configured to facilitate the controller 26 receiving sensor data from, and controlling, the bank of ultracapacitors 160 (FIGS. 7-8). For instance, one or more voltage sensors 158 may be in communication with the ultracapacitor interface 69. In such embodiments, the voltage sensor(s) 158 monitor operation of the bank of ultracapacitors 160 that may be used to power the pitch drive mechanism(s) 32 of the wind turbine 10. The voltage sensor(s) 158 may be configured to measure an output voltage at various locations on the bank of ultracapacitors 160. Alternatively, and/or additionally, one or more current sensors 159 may be in communication with the ultracapacitor interface 69. In such embodiments, the current sensor(s) 159 may be configured to measure an output current (e.g., discharge current) of the bank of ultracapacitors 160 when the bank of ultracapacitors 160 is coupled to a resistive load, for example.

Figure 4:
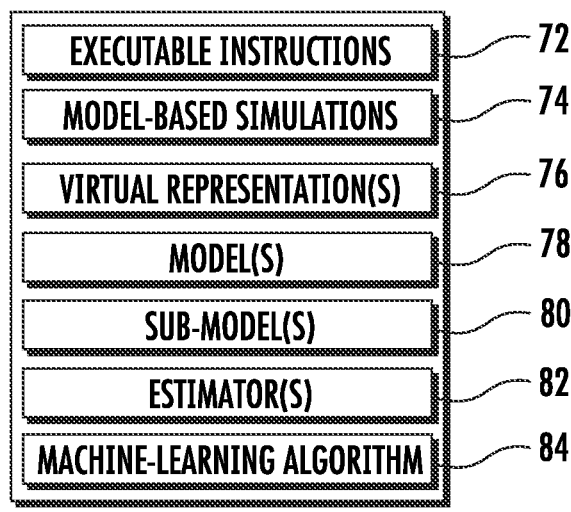
FIG. 4 illustrates a block diagram of an embodiment of suitable components that can be included within a processor of a controller of a system according to the present disclosure.

Moreover, as shown in FIG. 4, the processor(s) 62 of the controller 26 is configured to execute executable instructions 72 and run model-based simulations 74, virtual representation(s) 76, model(s) 78, sub-model(s) 80, and/or estimator(s) 82, to control the modules/interfaces of the controller 26, the wind turbine 10, and/or the system 100. In addition, as shown, the processor(s) 62 may include one or more machine learning algorithms 84 programmed therein.

Accordingly, various machine learning algorithms may be employed in the systems and methods of the present disclosure to iteratively refine the logic and/or the model-based simulations or estimators, virtual representations or simulations, models, sub-models, and/or estimators of the system 100 described herein, thereby increasing accuracy in the predictions that are based on such estimates and/or the high-frequency measurement data processing results. As such, in certain embodiments, the machine learning algorithm(s) 84 may receive feedback from the processor(s) 62 and train the feedback. Further, the machine learning algorithm(s) 84 may be a trained neural network, a simple linear regression model, a random forest regression model, a support vector machine, or any suitable type of a supervised learning model based on the quality and quantity of the data received. More specifically, in an embodiment, the system 100 may include an embedded reinforcement learning technique in the machine learning algorithm.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 121 may also be configured to compute advanced control algorithms and communicate to a variety of Ethernet or serial-based protocols (Modbus, OPC, CAN, etc.) as well as classical analog or digital signals. Additionally, the memory device(s) 64 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 64 may generally be configured to store suitable computer-readable instructions that, when implemented by the processor(s) 121, configure the controller 26 to perform various functions including, but not limited to, transmitting suitable control signals to implement corrective action(s) in response to a pitch bearing friction signal exceeding a predetermined threshold as described herein, as well as various other suitable computer-implemented functions.

Figure 5:
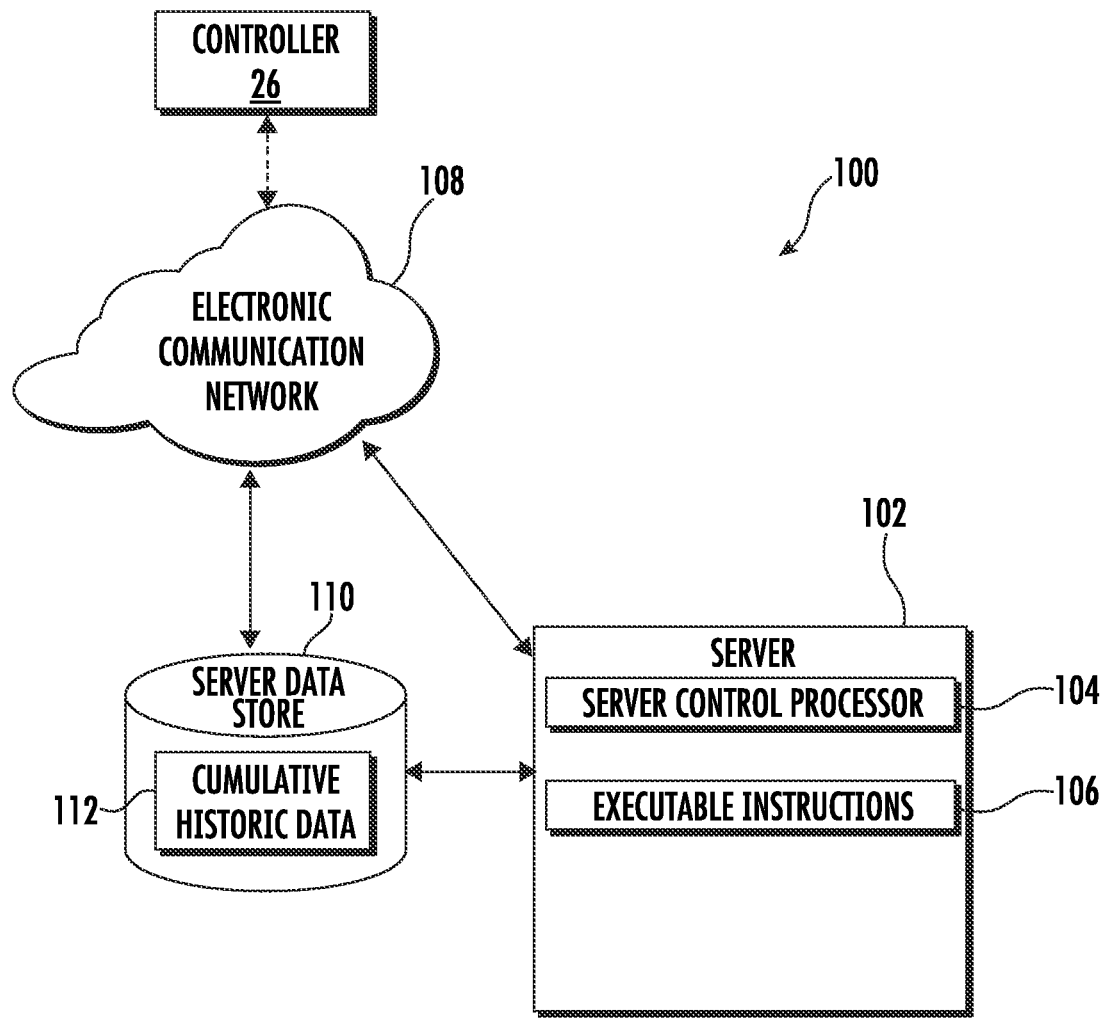
FIG. 5 illustrates a block diagram of an embodiment of a system for responding to a friction coefficient signal based on high-frequency measurement data according to the present disclosure.

Referring now to FIG. 5, a block diagram of one embodiment of a system 100 for responding to a friction coefficient signal of pitch bearing 48 using high-frequency measurement data in accordance with the aspects of the present disclosure is illustrated. As shown, the system 100 can include the controller 26 described herein, which as mentioned, receives measurement data from the sensors 52, 54, 56, 58, 59, 60, etc. and produces and transmits data signal(s) that can be sampled at high frequency. High-frequency data sampling of the measurement data can be varied as needed or called for, but "high-frequency" is generally understood as about 40.0 Hz or more, and for purposes of certain embodiments of the present disclosure is between about 25 Hz to about 100 Hz, or between about 16 Hz to about 200 Hz, or between about 1 Hz, for example, whereas low-frequency data sampling is generally understood as about less than 1.0 Hz. Depending on the embodiment, or the operating or real-world conditions, data sampling of the measurement data can have relatively higher or lower data sampling frequency(ies) at different stages or points of an operating cycle or timeline, or as needed or called for by the system 100.

Moreover, as shown, in an embodiment, the system 100 may include a server 102 having a server control processor 104 with executable instructions 106 that facilitate communications with and between the processor(s) 62 of the controller 26. In addition, the server control processor 104 may facilitate mitigating pitch bearing damage in the wind turbine 10 using high-frequency signal analysis to control and maintain operation of the wind turbine 10 during conditions wherein the friction signal of the pitch bearing 48 are within the design limits of the pitch drive mechanisms 32 and/or the bank of ultracapacitors 160 (FIG. 8). The server control processor 104 of the server 102 may facilitate leveraging the friction signal of the pitch bearing 48 derived from the system 100 to optimize, customize, and/or specialty-tailor the pitch drive mechanism(s) 32 and the other related systems, like the bank of ultracapacitors 160. Further, the server control processor 104 may facilitate the bank of ultracapacitors 160 to have a desired total energy capacity, and sufficient margin, to buffer against what is estimated to be prolonged elevations in pitch bearing friction, but without a max capacity that exceeds cost or safety limits. This disclosure is not limited to any particular implementation in this regard.

In addition, as shown, the system 100 may further include an electronic communication network 108 for facilitating communications between the controller 26 and the server 102. Moreover, as shown, the system 100 may include a server data store 110 that may include cumulative historic data 112 containing records of prior accumulated data that can be used by the controller 26 and/or the server 102. This cumulative data may be organized by unique identifiers and heuristics. Thus, as shown, the controller 26, the server 102, and/or any other processor or interface/module of wind turbine 10 may access the cumulative historic data 112 for particular records.

The electronic communication network 108 may be, or may be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that the systems and methods of the present disclosure are not limited by the nature of the network 102.

Thus, in certain embodiments, the controller 26 is configured to receive, in short time intervals, high-frequency measurement data from the pitch drive mechanism(s) 32. In one embodiment, the controller 26 may be configured to parse the short time intervals of the high-frequency measurement data received, and/or select a portion of the short time intervals of high-frequency measurement data based on wind and turbine conditions. The controller 26 may also be configured to receive a control command data or inputs, and to relay or send control data or action commands. For example, the controller 26 may be configured to implement a control action by sending a command to the pitch drive mechanism(s) 32 and/or the bank(s) of ultracapacitors 160 in response to a determination that there is a deviation from the desired friction threshold or condition. The controller 26 may also be configured to parse and select pitch motor current measurement data, rotor blade pitch speed/rate measurement data, pitch gearbox gear ratio measurement data, and/or the overall torque measurement data (as experienced by and translated to the pitch motor 44) and make it available for further processing or for use in computer-implemented models.

In addition, the controller 26 is configured to store the received, parsed, and/or processed high-frequency measurement data from the pitch drive mechanism(s) 32 in the memory device(s) 64. In one embodiment, the controller 26 may be configured to selectively receive and store short segments of high-frequency measurement data from pitch drive mechanism measurements via the electronic communication network 108 (FIG. 5) to estimate an aerodynamic torque based on wind or wind turbine 10 conditions. The controller 26 may also be configured to store high-frequency measurement data or associated data in the server data store 110 (FIG. 5). The controller 26 may also be configured to receive control command data as well as user interface inputs, and to relay or send control data or action commands. All the data or portions thereof may be made available for further processing and may be immediately purged or retained for future purposes. It is not necessary for the data to be stores for processing of the data to be accomplished. In an embodiment, the controller 26 and, therefore, the system 100 includes and/or is configured as is described in United States Patent Application No. U.S. Ser. No. 16/660, 084, filed Oct. 22, 2019 A1, and titled Wind Turbine Model Based Control and Estimation with Accurate Online Models (published as U.S. Patent Application Pub. No. US 2021/0115895 on Apr. 22, 2021), which is incorporated herein by reference in its entirety.

The controller 26 is further configured to estimate an aerodynamic torque using the high-frequency measurement data once the high-frequency measurement data are sampled. For example, in one embodiment, the controller 26 may be configured to pre-process the short time intervals of high-frequency measurement data received and/or run the model-based simulation(s) 74 to yield the aerodynamic torque estimate. In an embodiment, the controller 26 for estimating the aerodynamic torque using the high-frequency measurement data is configured as is described in United States Patent Application No. U.S. Ser. No. 16/660,084, filed Oct. 22, 2019 A1, and titled Wind Turbine Model Based Control and Estimation with Accurate Online Models (published as U.S. Patent Application Pub. No. US 2021/0115895 on Apr. 22, 2021), which is incorporated herein by reference in its entirety. Specifically, in an embodiment, the controller 26 may be configured to run a virtual representation(s) 76 or "digital twin" of the wind turbine 10, wherein the digital twin includes a set of computer-implemented models and algorithm, and wherein the digital twin processes, at least in part, the short time intervals of high-frequency measurement data to provide real-time estimates of the mechanical dynamics and loading and external wind field conditions of the wind turbine 10, not necessarily measurable by direct sensor measurement. The controller 26 also may be configured to use multiple model(s) 78 and/or sub-models 80 (e.g., structural models and aerodynamic models, etc.) that work together to process various categories of inputs to yield various categories of outputs. In particular, the categories of inputs that can be processed include actuator state data (e.g., rotor blade pitch position, rotor blade pitch velocity, air gap torque, pitch offsets), operating variable data (e.g., air density measures), high-frequency operational measurement data (e.g., generator speed, wind turbine electrical power used/produced, tower fa/ss acceleration, D/Q/azimuth, anemometer wind speed), and operating condition data (wind turbine operation and full states, grid-connected indicator data, measurement validity status).

Figure 6:
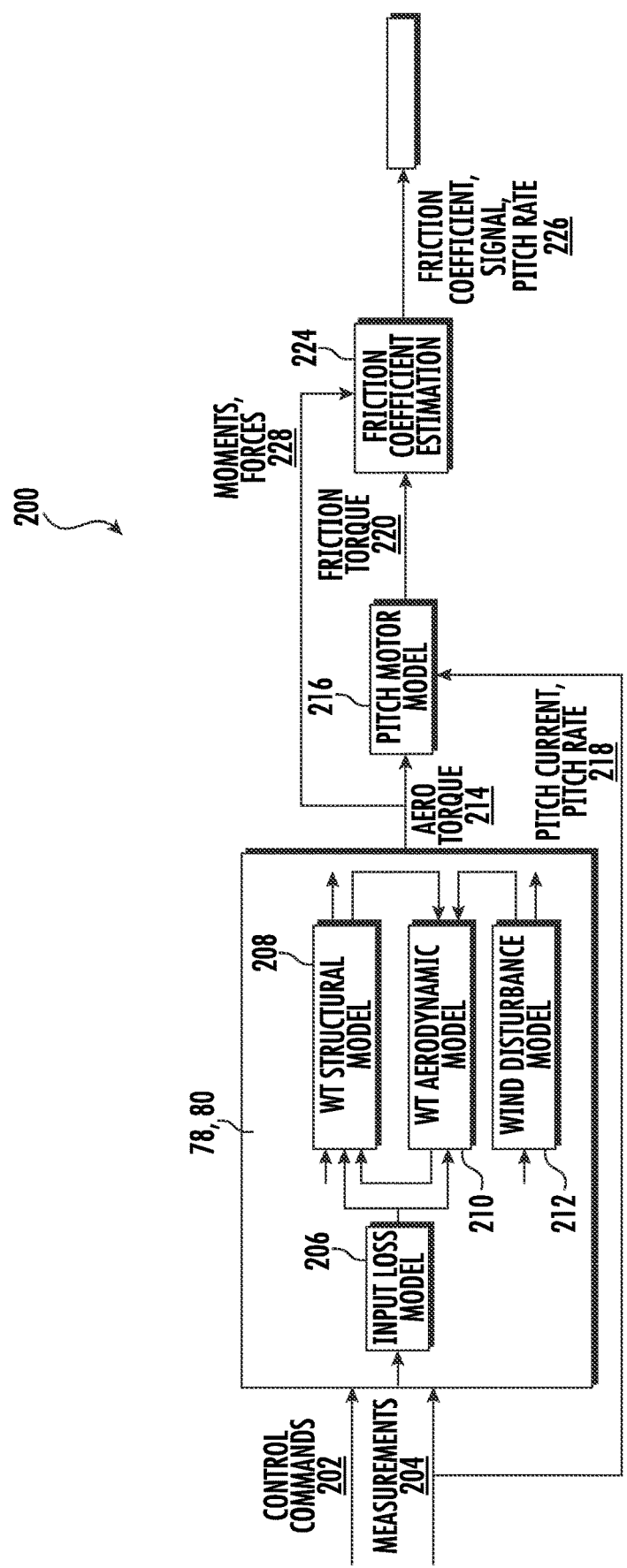
FIG. 6 illustrates a block diagram of an embodiment of a suitable control logic of a controller for responding to a friction coefficient signal according to the present disclosure.

Referring now to FIG. 6, a block diagram of an embodiment of a suitable control logic 200 of the controller 26 for responding to a friction coefficient signal is illustrated. In such embodiments, the processor(s) 62 of the controller 26 is configured to run the control logic 200. In particular, as shown, the inputs of the control logic 200 may include, at least in part, control command data 202 and the high-frequency measurement data 204 (obtained in short time intervals in certain embodiments, or continuously in other embodiments). Thus, as shown, the model(s) 78 and/or sub-models 80 of the processor(s) 62 may receive and process the input data via one or more models. For example, as shown, the models may include an input loss sub-model 206, a wind turbine structural sub-model 208, a wind turbine aerodynamic sub-model 210, and/or a wind disturbance sub-model 212, which are configured to operate together to process various categories of inputs to yield, in real-time, virtual or digital outputs. In particular, the input loss sub-model 206 may yield outputs that operate as inputs for the wind turbine structural sub-model 208 and the wind turbine aerodynamic sub-model 210. Similarly, the wind disturbance sub-model 212 may yield outputs that operate as inputs for the wind turbine aerodynamic sub-model 210. Similarly, the wind turbine aerodynamic sub-model 210 may yield outputs that operate as inputs for the wind turbine structural sub-model 208. Similarly, the wind turbine structural sub-model 208 may yield outputs that operate as inputs for the wind turbine aerodynamic sub-model 210.

Thus, as shown, the outputs of the model(s) 78 and/or sub-models 80 may include, at least in part, real-time aerodynamic torque estimate(s) 214. Moreover, as shown, a pitch motor torque balance model 216 is configured to receive the aerodynamic torque estimate(s) 214, as well as high-frequency rotor blade pitch speed/rate measurement data 218 to determine a frictional torque 220. For example, in an embodiment, the controller 26 may be configured to estimate the frictional torque 220 of the pitch bearing(s) 48 based, at least in part, on the pitch motor current measurement data, the rotor blade pitch speed/rate measurement data, the pitch gearbox gear ratio, the torque due to rotor blade pitch acceleration, and/or the overall torque measurement data of the pitch motor 44. Thus, as shown, the control logic 200 may also include a friction coefficient estimation model 224 configured to determine a friction coefficient signal/pitch rate 226 as a function of the frictional torque 220 and real-time estimate(s) of the distributed friction moments and/or forces 228 of the pitch bearing(s) 48. For example, in an embodiment, the controller 26 may also be configured to estimate the friction coefficient signal 226 of the pitch bearing(s) 48 based, at least in part, on the real-time estimates of wind turbine mechanical dynamics, torque, and loading, such as: FxB, FrB, and MrB.

In other words, in an embodiment, the overall torque experienced by the rotor blade(s) 22 and the corresponding pitch drive mechanism(s) 32 (and translated to the pitch motor(s) 44) may be equal to the sum of (1) the aerodynamic torque, (2) the frictional torque of at least one pitch bearing 48, and (3) the torque resulting from the rotor blade(s) 22 pitch acceleration or deceleration. Thus, in an embodiment, the controller 26 may also be configured to model the pitch motor(s) 44 of the pitch drive mechanism(s) 32 by considering the mechanical interactions and dynamics, and friction interactions and forces, between the components of the pitch drive mechanism(s) 32 and the corresponding rotor blade(s) 22.

In further embodiments, the categories of data that can be output from the model(s) 78 and/or sub-models 80 may include estimated wind turbine 10 state measures, e.g., structural states, blade root moments, blade tip deflections, rotor hub moments, drive train torsional moments, tower top/base moments, aerodynamic torque and thrust, rotor blade average wind speed, rotor blade effective wind speed. For example, as shown, the sub-models 80 that can be included in the controller 26 may include, for example, an input loss sub-model 206, a wind turbine structural sub-model 208, a wind turbine aerodynamic sub-model 210, and a wind disturbance sub-model 212 (FIG. 6).

The controller 26 may also be configured to yield, in real-time, from the digital twin, various important "virtual" or "digital" sensor outputs (i.e., estimates of the real world wind turbine 10) such as generator 24 speed, wind turbine electrical power used/produced, rotor blade position, tower top displacement (side-side, fore-aft), tower top rotation angle (yawing, nodding, torque), tower top acceleration or deceleration (side-side, fore-aft), rotor blade tip displacement (flap, edge), rotor blade root forces (axial, flap, edge) and moment (torsion, flap, edge), rotor hub center forces (downward, lateral, axial) and moments (yawing, nodding, torque) in rotating and fixed frames, rotor hub flange forces (downward, lateral, axial) and moments (yawing, nodding, torque) in rotating and fixed frames, tower top forces (downward, lateral, axial) and moments (yawing, nodding, torque), tower base forces (downward, lateral, axial) and moments (yawing, nodding, torque), and mean wind speed. The controller 26 may also be configured to estimate and make available for further processing, or for use in computer-implemented models, the following rotor blade root forces and moments: MxB, FxB, FrB, and MrB, wherein MxB is the estimated rotor blade 22 torsional moment and includes gravity.

The controller 26 is further configured to compare the estimated friction coefficient signal 226 of the pitch bearing(s) 48 with a friction threshold(s) for the pitch bearing(s) 48. For example, in an embodiment, the friction coefficient signal 226 of the pitch bearing(s) 48 correlates with the health of the pitch bearing(s) 48. For example, in one embodiment, the controller 26 may be configured to process and estimate the friction coefficient signal—over the data sample duration—and assess whether the signal 226 is or is not elevated as compared to the friction threshold, or whether the friction coefficient signal 226 is statistically higher for a particular pitch bearing 48 compared to another pitch bearing 48 of the pitch drive mechanism(s) 32. A statistical certainty measurement for the estimated friction coefficient signal may also be produced—to help determine the quality of the estimate and provide statistical confidence. In such embodiments, a statistical certainty measurement may be determined using standard error of the mean methods.

The controller 26 may also be configured to determine the friction threshold(s) for the pitch bearing(s) 48 based on a theoretical equation—taking into consideration the known or estimated distributed friction moment for the pitch bearing(s) 48 and the Rothe Erde equation—to make a classification of healthy and unhealthy pitch drive mechanism(s) 32. The theoretical equation yields an ideal pitch bearing coefficient signal, and the friction threshold may be set at any estimated friction coefficient signal that is 100% over the ideal pitch bearing coefficient signal. All the estimates and associated data, or portions thereof, may be made available for further processing and may be immediately purged or retained for future purposes.

The controller 26 is further configured to determine whether damage is present in the pitch bearing(s) 48 based, at least in part, on the comparison of the estimated friction coefficient signal 226 with the friction threshold(s) for the pitch bearing(s) 48. For example, in one embodiment, the controller 26 may process and determine whether damage is present in the pitch bearing(s) 48 by comparing the estimated friction coefficient signal with the signal produced from the theoretical equation. In another embodiment, the controller 26 may process and determine whether damage is present in the pitch bearing(s) 48 by comparing the estimated friction coefficient signal with the nominal friction for the turbine determined by its design or from typical values from other turbines of the same model, for example. If the controller 26 determines that there is a prolonged elevation or deviation in the estimated friction coefficient signal 226 when compared to the theoretical equation results, then the controller 26 may be configured to flag the situation and the conditions resulting in the situation. In addition, the controller 26 may be configured to alert a user or supervisory processor, trigger control measures to mitigate against the situation, and/or initiate a shutdown of the wind turbine 10.

For example, in one embodiment, the controller 26 is configured to implement a model-based and estimation-based techniques combined with a machine learning process to determine the friction coefficient signal, as shown particularly in Equations (1)-(4):

$$|T_{friction}| = q_0 \pi (D_{LKK})^2)/2 + \mu/2 (f_1 MrB + (D_{LKK})|FxB| + f_2 (D_{LKK}) FrB) \quad \text{EQ. (1)}$$

wherein, $q_0 \pi (D_{LKK})^2$ = Distributed Friction Moment
wherein, $2(f_1 MrB + (D_{LKK})|FxB| + f_2(D_{LKK})FrB)$ = Rothe Erde Equation $$T_{friction} = -\text{sign}(\theta')|T_{friction}| \text{ if } \theta' > 0$$

$$T_{friction} = \text{sign}(MxB)|T_{friction}| \text{ if } \theta' = 0$$

$$\text{FrictionTorque/GearRatio} = K^* \text{Flux}^* I_{sen} - (\theta''^* \text{GearRatio})^*(J/(\text{GearRatio})^2) - \text{AeroTorque/GearRatio} \quad \text{EQ. (2)}$$

$$\mu = 2^*((\text{FrictionTorque}^*\text{GearRatio} - (q_0 \pi(D_{LKK})^2/2^* \text{sign}(\theta'))/(f_1 MrB + (D_{LKK})|FxB| + f_2(D_{LKK})FrB)^{*''}\text{sign}(\theta'))); \text{ if } \theta' > 0, \theta' < 0 \quad \text{EQ. (3)}$$

$$\text{FrictionTorque} = q_0^* X_1 + \mu^* X_2; X_1 = \pi D(D_{LKK})^2/2^* \text{sign}(\theta'); X_2 = 0.5^*(f_1 MrB + (D_{LKK})|FxB| + f_2(D_{LKK})FrB)^* \text{sign}(\theta') \quad \text{EQ. (4)}$$

Thus, in certain embodiments, Equation (1) is representative of an exemplary embodiment of the theoretical equation used in the method as described herein, and of the types of logic used to estimate the friction coefficient. Equation (2) is representative of the types of logic used in the pitch motor model as described herein. Equations (3) and (4) also are representative of the types of logic used for estimating the friction coefficient. Constants $q_0$, $D_{LKK}$, $f_1$, $f_2$ are pitch bearing 48 dependent (i.e., four-point bearing, 0-bearing, etc.), while the constants J and GearRatio are pitch motor-type dependent. µ usually is unknown and typically is about 0.002 for new pitch bearings 48. In addition, positive pitch speed/rate and negative pitch speed/rate are taken into consideration.

Referring now to FIG. 7, a schematic diagram of an embodiment of a hardware system 300 for responding to a friction coefficient signal of the pitch bearing(s) 48 in accordance with the aspects of the present disclosure is illustrated. Each of the pitch drive mechanisms 32 is communicatively coupled to a power grid 302 as well as the bank of ultracapacitors 160. More specifically, in one exemplary embodiment, each of the ultracapacitors of the bank of ultracapacitors 160 may be associated with one of the pitch drive mechanisms 32 and may be stored in a cabinet 304. In some embodiments, the cabinet 304 may be a thermally-isolated container.

During normal operation of the wind turbine 10, a power converter 76 of the wind turbine 10 receives AC power from the power grid 302 and converts the AC power to AC power suitable for driving the pitch motor(s) 44 (e.g., AC motors) of each of the pitch drive mechanisms 32. Additionally, the power converter 76 can convert AC power received from the power grid 302 into direct current (DC) power suitable for charging the bank ultracapacitors 160. As will be discussed herein in detail, in some instances (e.g., extreme shutdown conditions), the pitch motors 44 may be driven by the bank of ultracapacitors 160.

When pitching of the rotor blades 22 relies on the bank of ultracapacitors 160, it is important to ensure that the bank of ultracapacitors 160 is capable operating when needed. Thus, the controller 26 is configured to implement a method to monitor the bank of ultracapacitors 160 in response to a pitch bearing friction signal exceeding a predetermined threshold. The controller 26 also is configured to implement a method for controlling operation of the pitch drive mechanisms 32 during conditions, and/or under control parameters, when the estimate of the pitch bearing friction signal is not within the design limits of the bank of ultracapacitor 160, for example, or any other scenario where the bank of ultracapacitors 160 is or may be used to pitch the rotor blades 22. Similarly, the controller 26 may also be designed using the systems and method of the present disclosure (to estimate the health and useful life of the pitch bearings 48, for example) to have a total capacity sufficient to implement a control strategy to monitor, control, and stop the wind turbine 10 by pitching to feather, without the bank of ultracapacitors 160 also being over designed and costing too much to implement or operate.

Referring now to FIG. 8, a schematic diagram of an embodiment of the power converter 306 of the bank of ultracapacitors 160 is illustrated. As shown, the power converter 306 includes an AC rectifier 310 configured to receive AC power from the power grid 302 at a first AC voltage and convert the first AC voltage to DC power at a first DC voltage. Additionally, the AC rectifier 310 is coupled to a power inverter 312 of the power converter 306. More specifically, in one embodiment, the AC rectifier 310 may be coupled to the power inverter 312 via one or more conductors (e.g., wires). In this manner, the output (e.g., DC power at first DC voltage) of the AC rectifier 310 may be provided to the power inverter 312. The primary power converter 310 may also include one or more capacitors 316 (e.g., electrolytic capacitors) coupled between the output of the AC rectifier 310 and the input of the power inverter 312. The one or more capacitors 316 may be configured to reduce or eliminate noise associated with the DC power that the AC rectifier 310 provides to the power inverter 312.

The power inverter 312 is configured to convert the DC power at the first DC voltage to AC power at a second AC voltage. In certain embodiments, the second AC voltage may be different (e.g., greater than or less than) than the first AC voltage associated with the AC power that the AC rectifier 310 receives from the power grid 302. The output (e.g., AC power at the second AC voltage) may be provided to the pitch motors 44 of the pitch drive mechanisms 32.

The power converter 306 also includes a DC-to-DC power converter 314. The DC-to-DC power converter 314 may be coupled to one or more input terminals (e.g., leads) associated with the power inverter 312. In this manner, the DC-to-DC power converter 314 can receive the DC power at the first DC voltage. Additionally, the DC-to-DC power converter 314 may be coupled to the bank of ultracapacitors 160. In certain embodiments, the DC-to-DC power converter 314 can convert the DC power at the first DC voltage to DC power at a second DC voltage that is suitable for charging and maintaining the bank of ultracapacitors 160. It should be appreciated that the second DC voltage can be different (e.g., less than or greater than) than the first DC voltage.

It should also be appreciated that FIGS. 1-8 are provided for illustrative purposes, and to place the present subject matter in an exemplary field of use. A person having ordinary skill in the art readily appreciates that the present disclosure is not limited to any one type of configuration.

Figure 9:
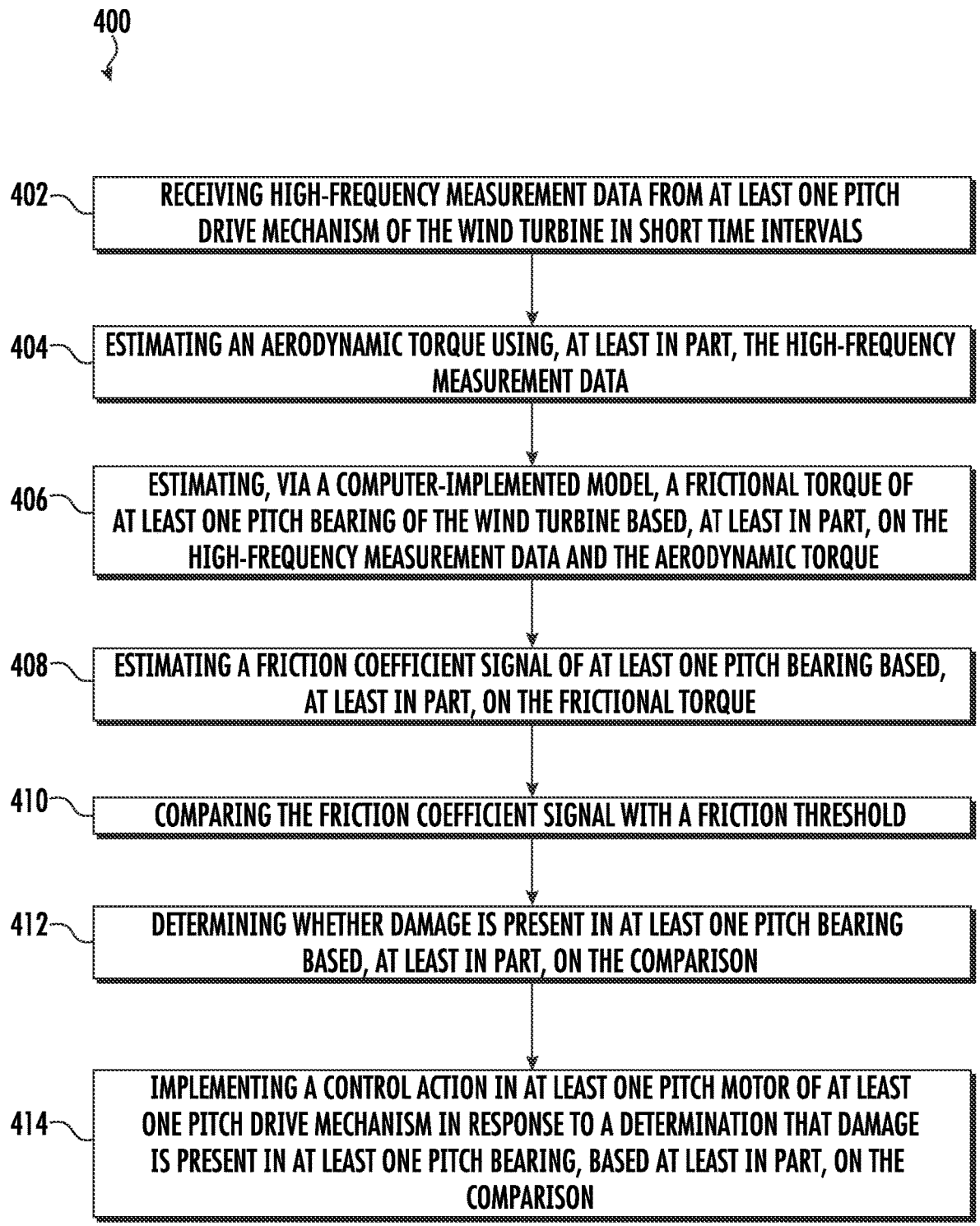
FIG. 9 illustrates a flow diagram of an embodiment of a method for responding to a friction coefficient signal of a pitch bearing of a pitch drive mechanism according to the present disclosure.

Referring now to FIG. 9, a flow diagram of an embodiment of a method 400 for responding to a friction coefficient signal of at least one pitch bearing of a wind turbine in accordance with the aspects of the present disclosure is illustrated. The method 400 may be implemented using the systems 70, 100, 150 discussed herein with references to FIGS. 1-8. FIG. 9 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously, or modified in various ways without deviating from the scope of the present disclosure.

As shown at (402), the method includes receiving, via the controller, high-frequency measurement data from at least one pitch drive mechanism of the wind turbine. As shown at (404), the method includes estimating, via the controller, an aerodynamic torque using, at least in part, the high-frequency measurement data. As shown at (406), the method includes estimating, via a computer-implemented model, a frictional torque of at least one pitch bearing of the wind turbine based, at least in part, on the high-frequency measurement data and the aerodynamic torque. As shown at (408), the method includes estimating, via the controller, a friction coefficient signal of at least one pitch bearing based, at least in part, on the frictional torque. As shown at (410), the method includes comparing the friction coefficient signal with a friction threshold which may, in certain embodiments, include comparing and determining if the friction coefficient signal is elevated relative to nominal design friction, nominal historical friction, friction of other pitch bearings or friction of other similar turbines, etc. As shown at (412), the method includes determining whether damage is present in at least one pitch bearing based, at least in part, on the comparison. As shown at (414), the method includes implementing a control action in at least one pitch motor of at least one pitch drive mechanism in response to a determination that damage is present in at least one pitch bearing, based at least in part, on the comparison.

This written description uses examples to disclose the disclosure, including the best mode, and to enable any person skilled in the art to practice the disclosure, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the disclosure is by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Various aspects and embodiments of the present disclosure are defined by the following numbered clauses:

Clause 1. A method for responding to a friction coefficient signal of at least one pitch bearing of a pitch drive mechanism of a wind turbine, the method comprising:

accessing high-frequency measurement data of the at least one pitch bearing;

estimating, via a torque balance model implemented by a controller, a frictional torque of the at least one pitch bearing based, at least in part, on the high-frequency measurement data;

estimating, via the controller, a friction coefficient signal of the at least one pitch bearing based, at least in part, on the frictional torque;

comparing the friction coefficient signal with a friction threshold;

determining whether the friction coefficient signal deviates from the friction threshold based, at least in part, on the comparison; and implementing a control action in response to a determination that the friction coefficient signal deviates from the friction threshold.

Clause 2. The method of clause 1, wherein accessing the high-frequency measurement data comprises accessing about 40 hertz measurement data.

Clause 3. The method of any of the preceding clauses, wherein the high-frequency measurement data comprises at least one of pitch motor current measurement data and rotor blade pitch speed measurement data.

Clause 4. The method of any of the preceding clauses, further comprising estimating, via the controller, an aerodynamic torque using the high frequency measurement data, wherein estimating the aerodynamic torque using the high-frequency measurement data further comprises running, via the controller, a model-based estimator as a function of one or more control commands and the high-frequency measurement data to yield the aerodynamic torque.

Clause 5. The method of clause 4, wherein the model-based estimator comprises a virtual simulation of the wind turbine, and wherein running the model-based estimator comprises estimating, in real-time, one or more virtual or digital sensor outputs from the virtual representation of the wind turbine.

Clause 6. The method of any of clauses 4-5, wherein the model-based estimator comprises at least one of an input loss sub-model, a wind turbine structural sub-model, a wind turbine aerodynamic sub-model, and a wind disturbance sub-model.

Clause 7. The method of any of clauses 4-6, wherein running the model-based estimator yields estimates of distributed friction moments and forces acting on the at least one pitch bearing.

Clause 8. The method of any of the preceding clauses, further comprising estimating, via the controller, an aerodynamic torque using the high frequency measurement data, wherein estimating, via the torque balance model of the controller, the frictional torque is based, at least in part, on the high-frequency measurement data and the aerodynamic torque estimate; and wherein, for the torque balance model, an overall torque translated to a pitch motor of the pitch drive mechanism is the sum of:
the aerodynamic torque;
the frictional torque of the at least one pitch bearing; and
a torque resulting from a rotor blade pitch acceleration or deceleration.

Clause 9. The method of clause 8, wherein estimating the frictional torque of the at least one pitch bearing based, at least in part, on the high-frequency measurement data and the aerodynamic torque further comprises:
estimating the frictional torque of the at least one pitch bearing based, at least in part, on a combination of the following: the pitch motor current measurement data, rotor blade pitch speed measurement data, pitch gearbox gear ratio data, torque measurement data corresponding to rotor blade pitch acceleration or deceleration, and torque measurement data corresponding to overall torque of a pitch motor of the pitch drive mechanism.

Clause 10. The method of any of clauses 8 and 9, wherein estimating the friction coefficient signal of the at least one pitch bearing also is based, at least in part, on estimates of distributed friction moments and forces acting on the at least one pitch bearing, and wherein the estimates of the distributed friction moments and forces acting on the at least one pitch bearing are based, at least in part, on at least a portion of the high-frequency measurement data.

Clause 11. The method of clause 10, wherein estimating the aerodynamic torque using the high-frequency measurement data comprises running, via the controller, a model-based estimator comprising a virtual simulation or digital twin of the wind turbine to yield the aerodynamic torque estimate, and wherein the running a model-based estimator comprises estimating, in real-time, one or more virtual or digital sensor outputs from the virtual representation or the digital twin of the wind turbine, the one or more virtual or digital sensor outputs comprising the aerodynamic torque estimate and estimates of distributed friction moments and forces acting on the at least one pitch bearing.

Clause 12. The method of any of the preceding clauses, wherein implementing the control action further comprises at least one of sending a notification to alert of the friction coefficient signal deviating from the friction threshold, sending a command to at least one pitch drive mechanism, shutting down the wind turbine, derating the wind turbine, or uprating the wind turbine.

Clause 13. The method of any of the preceding clauses, further comprising controlling a bank of ultracapacitors in response to a determination that the friction coefficient signal deviates from the friction threshold.

Clause 14. The method of clause 13, wherein controlling a bank of ultracapacitors comprises at least one of powering the pitch drive mechanism via the bank of ultracapacitors or adjusting the charge of an ultracapacitors of the bank of ultracapacitors.

Clause 15. A system for responding to a friction coefficient signal of at least one pitch bearing of a wind turbine, the system comprising:
a pitch drive mechanism comprising at least one pitch bearing; and
a controller comprising:
a high-frequency measurement data interface configured to receive high-frequency measurement data, wherein the high-frequency measurement data comprises high-frequency measurement data of the at least one pitch bearing from the pitch drive mechanism; and
a processor configured to:
estimate, via a torque balance model of the controller, a frictional torque of the at least one pitch bearing based, at least in part, on the high-frequency measurement data;
estimate a friction coefficient signal of the at least one pitch bearing based, at least in part, on the frictional torque;
compare the friction coefficient signal with a friction threshold;
determine whether the friction coefficient signal deviates from the friction threshold based, at least in part, on the comparison; and
implement a control action in response to a determination that the friction coefficient signal deviates from the friction threshold.

Clause 16. The system of clause 15, wherein the processor is further configured to run a model-based simulation to estimate an aerodynamic torque, wherein the model-based simulation comprises a virtual representation of the wind turbine configured to estimate, in real-time, one or more virtual or digital sensor outputs from the virtual representation of the wind turbine, the one or more virtual or digital sensor outputs comprising estimates of distributed friction moments and forces acting on the at least one pitch bearing.

Clause 17. The system of clause 16, wherein the model-based simulation comprises at least one of an input loss sub-model, a wind turbine structural sub-model, a wind turbine aerodynamic sub-model, and a wind disturbance sub-model.

Clause 18. The system of any of clause 15-17, wherein the processor is further configured to estimate an aerodynamic torque using high-frequency measurement data, wherein the torque balance model is configured to estimate the frictional torque of the at least one pitch bearing based, at least in part, on an overall torque translated to a pitch motor of the pitch drive mechanism, and wherein the overall torque translated to the pitch motor is the sum of:
the aerodynamic torque;
the frictional torque of the at least one pitch bearing; and
a torque resulting from a rotor blade pitch acceleration or deceleration.

Clause 19. The system of clause 18, wherein the high-frequency measurement data comprises a combination of the following: the pitch motor current measurement data, rotor blade pitch speed measurement data, pitch gearbox gear ratio data, torque measurement data corresponding to rotor blade pitch acceleration or deceleration, and torque measurement data corresponding to overall torque of a pitch motor of the pitch drive mechanism, and wherein the computer-implemented model is configured to estimate the frictional torque of the at least one pitch bearing based, at least in part, on the combination and the aerodynamic torque.

Clause 20. The system of any of clause 15-19, further comprising a bank of ultracapacitors, wherein the controller further comprises an ultracapacitor interface configured to communicate with the bank of ultracapacitors, and wherein the bank of ultracapacitors is configured to power, at least in part, the pitch drive mechanism.

This written description uses examples to disclose the disclosure, including the best mode, and to enable any person skilled in the art to practice the disclosure, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the disclosure is by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for responding to a friction coefficient signal of at least one pitch bearing of a pitch drive mechanism of a wind turbine, the method comprising:
   accessing high-frequency measurement data of the at least one pitch bearing;
   estimating, via a torque balance model implemented by a controller, a frictional torque of the at least one pitch bearing based, at least in part, on the high-frequency measurement data;
   estimating, via the controller, a friction coefficient signal of the at least one pitch bearing based, at least in part, on the frictional torque;
   comparing the friction coefficient signal with a friction threshold;
   determining whether the friction coefficient signal deviates from the friction threshold based, at least in part, on the comparison; and
   implementing a control action in response to a determination that the friction coefficient signal deviates from the friction threshold.

2. The method of claim 1, wherein accessing the high-frequency measurement data comprises accessing about 40 hertz measurement data.

3. The method of claim 1, wherein the high-frequency measurement data comprises at least one of pitch motor current measurement data and rotor blade pitch speed measurement data.

4. The method of claim 1, further comprising estimating, via the controller, an aerodynamic torque using the high frequency measurement data, wherein estimating the aerodynamic torque using the high-frequency measurement data further comprises running, via the controller, a model-based estimator as a function of one or more control commands and the high-frequency measurement data to yield the aerodynamic torque.

5. The method of claim 4, wherein the model-based estimator comprises a virtual simulation of the wind turbine, and wherein running the model-based estimator comprises estimating, in real-time, one or more virtual or digital sensor outputs from the virtual representation of the wind turbine.

6. The method of claim 4, wherein the model-based estimator comprises at least one of an input loss sub-model, a wind turbine structural sub-model, a wind turbine aerodynamic sub-model, and a wind disturbance sub-model.

7. The method of claim 4, wherein running the model-based estimator yields estimates of distributed friction moments and forces acting on the at least one pitch bearing.

8. The method of claim 1, further comprising estimating, via the controller, an aerodynamic torque using the high frequency measurement data, wherein estimating, via the torque balance model of the controller, the frictional torque is based, at least in part, on the high-frequency measurement data and the aerodynamic torque estimate; and wherein, for the torque balance model, an overall torque translated to a pitch motor of the pitch drive mechanism is the sum of:
   the aerodynamic torque;
   the frictional torque of the at least one pitch bearing; and
   a torque resulting from a rotor blade pitch acceleration or deceleration.

9. The method of claim 8, wherein estimating the frictional torque of the at least one pitch bearing based, at least in part, on the high-frequency measurement data and the aerodynamic torque further comprises:
   estimating the frictional torque of the at least one pitch bearing based, at least in part, on a combination of the following: the pitch motor current measurement data, rotor blade pitch speed measurement data, pitch gearbox gear ratio data, torque measurement data corresponding to rotor blade pitch acceleration or deceleration, and torque measurement data corresponding to overall torque of a pitch motor of the pitch drive mechanism.

10. The method of claim 8, wherein estimating the friction coefficient signal of the at least one pitch bearing also is based, at least in part, on estimates of distributed friction moments and forces acting on the at least one pitch bearing, and wherein the estimates of the distributed friction moments and forces acting on the at least one pitch bearing are based, at least in part, on at least a portion of the high-frequency measurement data.

11. The method of claim 10, wherein estimating the aerodynamic torque using the high-frequency measurement data comprises running, via the controller, a model-based estimator comprising a virtual simulation or digital twin of the wind turbine to yield the aerodynamic torque estimate, and wherein the running a model-based estimator comprises estimating, in real-time, one or more virtual or digital sensor outputs from the virtual representation or the digital twin of the wind turbine, the one or more virtual or digital sensor outputs comprising the aerodynamic torque estimate and estimates of distributed friction moments and forces acting on the at least one pitch bearing.

12. The method of claim 1, wherein implementing the control action further comprises at least one of sending a notification to alert of the friction coefficient signal deviating from the friction threshold, sending a command to at least one pitch drive mechanism, shutting down the wind turbine, derating the wind turbine, or uprating the wind turbine.

13. The method of claim 1, further comprising controlling a bank of ultracapacitors in response to a determination that the friction coefficient signal deviates from the friction threshold.

14. The method of claim 13, wherein controlling a bank of ultracapacitors comprises at least one of powering the pitch drive mechanism via the bank of ultracapacitors or adjusting the charge of an ultracapacitors of the bank of ultracapacitors.

15. A system for responding to a friction coefficient signal of at least one pitch bearing of a wind turbine, the system comprising:
a pitch drive mechanism comprising at least one pitch bearing; and
a controller comprising:
a high-frequency measurement data interface configured to receive high-frequency measurement data, wherein the high-frequency measurement data comprises high-frequency measurement data of the at least one pitch bearing from the pitch drive mechanism; and
a processor configured to:
estimate, via a torque balance model of the controller, a frictional torque of the at least one pitch bearing based, at least in part, on the high-frequency measurement data;
estimate a friction coefficient signal of the at least one pitch bearing based, at least in part, on the frictional torque;
compare the friction coefficient signal with a friction threshold;
determine whether the friction coefficient signal deviates from the friction threshold based, at least in part, on the comparison; and
implement a control action in response to a determination that the friction coefficient signal deviates from the friction threshold.

16. The system of claim 15, wherein the processor is further configured to run a model-based simulation to estimate an aerodynamic torque, wherein the model-based simulation comprises a virtual representation of the wind turbine configured to estimate, in real-time, one or more virtual or digital sensor outputs from the virtual representation of the wind turbine, the one or more virtual or digital sensor outputs comprising estimates of distributed friction moments and forces acting on the at least one pitch bearing.

17. The system of claim 16, wherein the model-based simulation comprises at least one of an input loss sub-model, a wind turbine structural sub-model, a wind turbine aerodynamic sub-model, and a wind disturbance sub-model.

18. The system of claim 15, wherein the processor is further configured to estimate an aerodynamic torque using high-frequency measurement data, wherein the torque balance model is configured to estimate the frictional torque of the at least one pitch bearing based, at least in part, on an overall torque translated to a pitch motor of the pitch drive mechanism, and wherein the overall torque translated to the pitch motor is the sum of:
the aerodynamic torque;
the frictional torque of the at least one pitch bearing; and
a torque resulting from a rotor blade pitch acceleration or deceleration.

19. The system of claim 18, wherein the high-frequency measurement data comprises a combination of the following: the pitch motor current measurement data, rotor blade pitch speed measurement data, pitch gearbox gear ratio data, torque measurement data corresponding to rotor blade pitch acceleration or deceleration, and torque measurement data corresponding to overall torque of a pitch motor of the pitch drive mechanism, and wherein the computer-implemented model is configured to estimate the frictional torque of the at least one pitch bearing based, at least in part, on the combination and the aerodynamic torque.

20. The system of claim 15, further comprising a bank of ultracapacitors, wherein the controller further comprises an ultracapacitor interface configured to communicate with the bank of ultracapacitors, and wherein the bank of ultracapacitors is configured to power, at least in part, the pitch drive mechanism.

* * * * *